FIG. 1
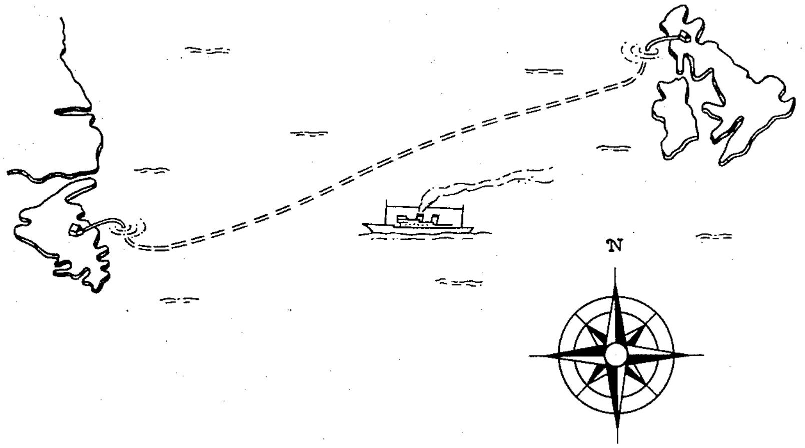
FIG. 2
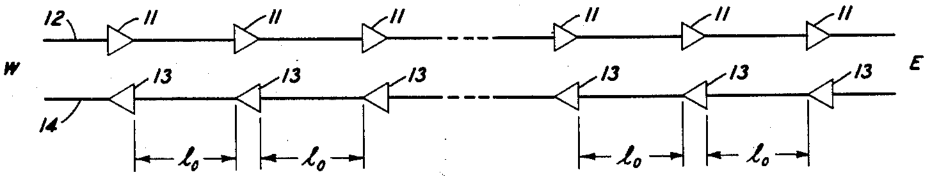
FIG. 3
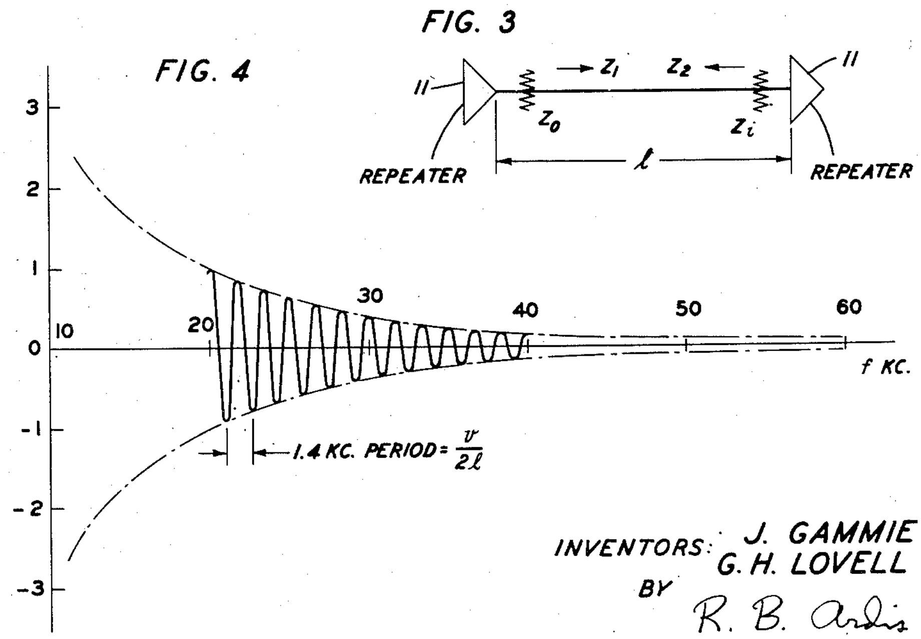
FIG. 4
INVENTORS: J. GAMMIE
G. H. LOVELL
BY R. B. Ardis
ATTORNEY INVENTORS: J. GAMMIE
G.H. LOVELL
BY R. B. Ardis
ATTORNEY United States Patent Office 2,776,345
Patented Jan. 1, 1957

2,776,345

DISTORTION CORRECTION IN REPEATERED CARRIER TRANSMISSION SYSTEMS

James Gammie and George H. Lovell, Summit, N. J., assignors to Bell Telephone Laboratories, Incorporated, New York, N. Y., a corporation of New York Application July 21, 1955, Serial No. 523,465

10 Claims. (Cl. 179—171)

This invention relates generally to repeatered signal transmission lines operable over a wide band of carrier frequencies and more particularly, although in its broader aspects not exclusively, to repeatered signal transmission lines of the submarine cable type, in which repeater locations are not determined primarily by geographical considerations.

When the repeaters of a signal transmission system have input and output impedances differing substantially from the line impedance, part of the signal current reaching the input of each repeater is reflected back toward the output of the preceding repeater, where another reflection occurs. Thus, at the input of the repeater first mentioned, the original signal is joined by a doubly reflected current after a delay equal to twice the time of transmission between the two repeaters and weaker by twice the attenuation of the transmission line section and the sum of the two return losses. Since the attenuation of the line increases with frequency, the rejoining reflected current is strongest at the low end of the frequency band of the system and decreases with increasing frequency. Because of the change in phase with frequency, this current phases in and out with the original signal, resulting in ripples in the overall system attenuation characteristic. Such ripples (generally called "interaction ripples") are usually not amenable to equalization on a broad band basis and, because of their cumulative nature, tend to be particularly severe in a transoceanic submarine cable system thousands of miles long.

In the past, interaction ripples in long repeatered transmission lines have been minimized by careful design of repeater input and output impedances. This has generally involved the use of either terminated networks or hybrid networks in coupling the repeaters to the line. Both techniques, however, reduce the gain of the repeater below what it would be if non-terminated coupling networks could be used and necessitate either an increase in the total number of repeaters needed in a long signal transmission system or a decrease in the amount of negative feedback which it is possible to employ within the signal frequency band for stabilization purposes. In addition, both techniques have generally involved at least a certain amount of increased circuit complexity, which not only results in increased repeater cost but also in increased repeater size. The latter aspect is particularly important in a transmission line of the submarine cable type since, in order to facilitate the cable-laying process, it is desirable to have as little increase in the cable diameter at repeater points as possible.

A principal object of the present invention is to reduce the interaction ripples appearing in a repeatered signal transmission line without having to match the repeater impedances to the line impedance.

A correlative object is to increase the gain available from the repeaters of a repeatered signal transmission line without causing increased interaction ripples to appear in the overall attenuation characteristic of the system.

Another object is to improve the signal-to-noise ratio of a long repeatered signal transmission line in as simple a manner as possible.

Still another object is to permit either a decrease in the number of repeaters required or an increase in the amount of in-band feedback employed in a long repeatered signal transmission line.

In accordance with a principal feature of the invention, all of the above objects are accomplished in a long repeatered carrier-frequency signal transmission line by staggering the longitudinal repeater spacing in a carefully predetermined manner. In each direction of transmission, the repeaters divide the line into a succession of pairs of adjacent consecutive line-sections between repeaters. In accordance with a feature of the present invention, the lengths of the two line-sections in each pair are substantially $(l_0-\delta)$ and $(l_0+\delta)$, respectively, where $l_0$ is the mean length between repeaters of all of the line-sections and $\delta$ is a quarter of a wavelength along the line at a predetermined frequency within the signal band of the system. This repeater spacing results in oppositely phased ripples in the line-sections of each pair in the frequency region near the predetermined frequency, with a resulting cancellation of the overall variation. At frequencies more removed from the selected frequency, the ripples in the line-sections of each pair are less oppositely phased until, finally, at some frequencies, they add together. The overall effect, however, is still many times less than that occurring in an unmatched system having repeaters equally spaced in the manner taught by the prior art.

In accordance with another important feature of the invention, the predetermined frequency at which $\delta$ is equivalent to a quarter of a wavelength along the line is at substantially the lower edge of the signal band. Interaction ripples are thereby canceled almost completely at the end of the operating frequency band at which their magnitude would otherwise be greatest. In a four-wire system, in which separate cables are used for opposite directions of transmission, the predetermined frequency at which $\delta$ is a quarter of a wavelength is, in accordance with this feature of the invention, at substantially the lower edge of the carrier band on each cable. In a two-wire system, on the other hand, in which different carrier bands are used to provide two opposite directions of transmission over a single cable, that predetermined frequency is at substantially the lower edge of the lowest carrier band.

A more complete understanding of the invention may be obtained from the following detailed description of several specific embodiments thereof and their mode of operation. In the drawings:

Fig. 1 illustrates the route of a transatlantic repeatered submarine telephone cable for carrier frequency operation which may, with particular advantage, be made to embody various features of the present invention;

Fig. 2 shows a repeatered four-wire signal transmission line arrangement suitable for use in Fig. 1 in which the repeater spacing is in accordance with the teachings of the prior art;

Fig. 3 is a sketch of a single line-section existing between between a pair of successive repeaters and is used to assist in formulating a number of equations;

Fig. 4 illustrates the interaction ripples occurring in prior art repeatered signal transmission systems with impedance mismatches between repeaters and the line;

Figure 5:
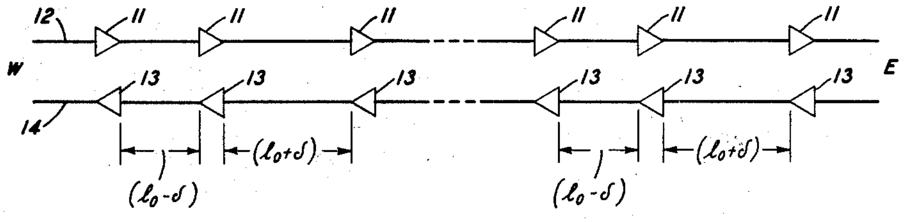
Fig. 5 shows a repeatered four-wire signal transmission line arrangement suitable for use in Fig. 1 in which the repeater spacing is staggered in accordance with the teachings of the present invention.

As has already been suggested in the foregoing brief introductory description of the invention, interaction ripples tend to be of particular importance in transoceanic submarine cable signal transmission systems. Because of their cumulative nature, such ripples are likely to be more severe in such systems unless special precautions are taken than they would be in shorter land line communication systems, the repeater points of which are readily accessible for equalization. Fig. 1 of the drawings is a rough diagrammatic illustration of one such transoceanic cable—a transatlantic carrier telephone submarine cable system extending for approximately 2000 nautical miles on the ocean floor between Newfoundland and Scotland. Fifty-two repeaters are spaced at intervals throughout the length of the system to overcome line losses.

If designed in accordance with the principles known in the prior art, the transatlantic cable shown diagrammatically in Fig. 1 may take the form of the repeatered "four-wire" transmission line illustrated in Fig. 2. The system in Fig. 2 has electrically separate channels for transmission from west to east and from east to west, each of which may, for example, have its own physically separate repeaters and be in a physically separate cable. A plurality of one-way repeaters 11 are spaced at equal intervals along the line 12, providing a plurality of west-east carrier communication channels, and a similar number of oppositely directed repeaters 13 are spaced at equal intervals along the line 14, providing the east-west carrier channels. For both directions of transmission, the repeaters in Fig. 2 are separated by a distance $l_0$ measured lengthwise along the transmission line.

The effect of interaction ripples in a system like that shown in Fig. 2 may best be shown with the aid of the sketch of a single line-section between repeaters given in Fig. 3. In Fig. 3, there is shown a single line-section between a pair of adjacent consecutive west-east repeaters 11. The distance in nautical miles along the line 12 from the output of the first repeater to the input of the second is $l$, $Z_0$ is the output impedance of the first repeater, $Z_i$ is the input impedance of the second repeater, $Z_1$ is the image impedance of the line as seen from the first repeater, and $Z_2$ is the image impedance of the line as seen from the second repeater.

The interaction factor (IAF) for the section of line shown in Fig. 3 is given by $$IAF=1-r_1r_2e^{-2\gamma l} \qquad (1)$$

wherein $r_1$ and $r_2$ are the reflection coefficients at the first and second repeaters, respectively, and $\gamma$ is the propagation constant of the line per nautical mile. The propagation constant $\gamma$ can be separated into its real and imaginary components $$\gamma=\alpha+j\beta \qquad (2)$$

and, since the reflection coefficients $r_1$ and $r_2$ are, by definition, $$r_1=\frac{Z_1-Z_0}{Z_1+Z_0} \qquad (3)$$

and $$r_2=\frac{Z_2-Z_i}{Z_2+Z_i} \qquad (4)$$

the interaction factor in db is given by $$|IAF|=20\log_{10}\left|1-\left(\frac{Z_1-Z_0}{Z_1+Z_0}\right)\left(\frac{Z_2-Z_i}{Z_2+Z_i}\right)e^{-2(\alpha+j\beta)l}\right| \qquad (5)$$

An expression can readily be obtained which ilustrates the sinuosity exhibited by Equation 5. If the product of the two reflection coefficients is represented by a complex number $A+jB$, it can be shown that $$|IAF|=10\log_{10}[1-2e^{-2\alpha l}(A\cos 2\beta l+B\sin 2\beta l)+e^{-4\alpha l}(A^2+B^2)] \qquad (6)$$

which can be approximated for all practical situations by $$IAF\doteq 8.686\, e^{-2\alpha l}(A\cos 2\beta l+B\sin 2\beta l) \qquad (7)$$

or $$|IAF|\doteq 8.686\sqrt{A^2+B^2}e^{-2\alpha l}\left[\cos\left(2\beta l-\tan^{-1}\frac{B}{A}\right)\right] \qquad (8)$$

Since $$\beta=\frac{2\pi f}{v} \qquad (9)$$

the ripple frequency is given by $$f_r=\frac{v}{2l} \qquad (10)$$

where $v$ is the velocity of wave propagation over the transmission line medium.

If the velocity of propagation $v$ were constant with frequency and the ratio $$\frac{B}{A}$$

independent of frequency, Equation 8 would represent simply an amplitude-modulated wave. Furthermore, if $A^2+B^2$ were independent of frequency, the envelope would be simply exponential. Deviations from these ideals are small, however, in most repeatered carrier signal transmission systems and do not materially affect the analysis other than by introducing a small non-uniformity in the ripple frequency. The ripples, in other words, are angle-modulated as well as amplitude-modulated, but with the angle component so small as to be relatively insignificant.

When each transmission line-section in a long repeatered system of the prior art type shown in Fig. 2 exhibits the same electrical performance in its respective working environment, the overall interaction ripples for the system may be obtained merely by multiplying Equation 7 or 8 by the number of line-sections in the system. In order to ilustrate such an overall system ripple, Equation 7 has been plotted in Fig. 4 for the transatlantic cable system illustrated in Fig. 1, assuming mismatches between repeaters and line and using the prior art repeater arrangement shown in Fig. 2. The length $l_0$ of each line-section between repeaters is approximately 36.9 nautical miles, there are fifty-two line-sections in all, and the line impedance and attenuation in each section are those found in a standard 0.620 inch submarine telephone cable. The velocity of propagation over the cable medium is substantially constant at $10^5$ nautical miles per second for the operating frequency range from 20 to 164 kilocycles. The magnitudes of the reflection coefficients at the repeater terminals are assumed, by way of example, to be of the order of 50 percent for this frequency range.

In Fig. 4, the plot of Equation 7 has been normalized to unity at 20 kilocycles in order to facilitate comparison, and all ordinates should be multiplied by 0.8 to obtain actual system ripple magnitudes in db. As shown, the peak ripple amplitude in the neighborhood of 20 kilocycles, the lower edge of the operating frequency band, is about±0.8 db, with a nominal frequency of 1.4 kilocycles. Since all ripple lengths and their associated attenuations are assumed equal in this analysis, Fig. 4 represents the maximum effect which may be expected due to interaction ripples for the submarine cable system of Fig. 1.

As has already been indicated, past practice has been to minimize interaction ripples in a long repeatered signal transmission system like that shown in Fig. 1 by carefully matching the repeater input and output impedances to the impedance of the line, either through the use of terminating impedances for the repeater coupling networks or through the use of hybrid coupling networks. Both techniques, however, reduce the gain available from each repeater and necessitate either an increase in the number of repeaters used in the system or a decrease in the amount of in-band feedback that may be applied for stabilization purposes. Since such ripples are cumulative over a long system, the problem assumes particular importance when a transmission system having the overall length of the transatlantic submarine cable system shown in Fig. 1 is contemplated.

In accordance with the present invention, the interaction ripples appearing in a long-carrier-frequency signal transmission system like the transatlantic cable system shown in Fig. 1 may be reduced to a minor fraction of the amplitude shown in Fig. 4 without any necessity for detracting from repeater gain for impedance matching purposes. In the prior art arrangement illustrated in Fig. 2, the system is divided by the repeaters into a succession of consecutive line-sections, the length of each line-section being designated $l_0$. In accordance with a principal feature of the present invention, the length of each line-section is so fixed relative to the next adjacent consecutive line-section that the lengths of the two sections are $(l_0-\delta)$ and $(l_0+\delta)$, respectively, where $l_0$ is the mean length between repeaters of all of the line-sections (the length of each line-section in Fig. 2) and $\delta$ is a quarter of a wavelength along the line at a frequency $f_c$ near the bottom of the operating frequency band of the system. The interaction ripples in successive line-sections are thereby made to cancel each other at the selected frequency in a manner which will be explained and are greatly reduced at other frequencies.

In accordance with the present invention, the transatlantic submarine cable shown in Fig. 1 may take the form of the repeatered "four-wire" transmission system shown in Fig. 5. The system there is the same as the prior art system in Fig. 2 except that, instead of all repeaters being separated along the line from the next succeeding adjacent repeater by a distance of $l_0$, the lengths of the line-sections in each pair of consecutive adjacent line-sections are $(l_0-\delta)$ and $(l_0+\delta)$, respectively. As stated above, $\delta$ is a quarter of a wavelength along the line at a frequency $f_c$ at or near the bottom of the operating signal band. It is given by the expression $$\delta=\frac{v}{8f_c} \tag{11}$$

where $f_c$ is the selected frequency of ripple cancellation.

If, as shown by Equation 8, the magnitude of the interaction factor for a single line-section is approximated by $$|IAF|\doteq Ke^{-2\alpha l}\cos(2\beta l+\varphi) \tag{12}$$

where $\varphi$ and K are independent of length, then the interaction factor for two line-sections of lengths $(l_0-\delta)$ and $(l_0+\delta)$, respectively, is given by $$|IAF|=|IAF|_1+|IAF|_2=K(e^{-2\alpha(l_0-\delta)}\cos[2\beta(l_0-\delta)+\varphi]+e^{-2\alpha(l_0+\delta)}\cos[2\beta(l_0+\delta)+\varphi]) \tag{13}$$

For $\delta<<l_0$ in the exponential factor, Equation 13 can be approximated by $$|IAF|=|IAF|_1+|IAF|_2\doteq 2Ke^{-2\alpha l_0}\cos 2\beta\delta\cos(2\beta\delta_0+\varphi) \tag{14}$$

which shows that the exponentially damped sinusoid is amplitude-modulated by $(\cos 2\beta\delta)$. It is readily seen that Equation 14 is zero whenever $2\beta\delta$ is an odd multiple $$\frac{\pi}{2}$$

When $2\beta\delta$ is zero or an even multiple of $$\frac{\pi}{2}$$

the interaction factor for two sections is the same as that obtained by doubling the interaction factor for one of them. The relation between $\delta$ and $f_c$, the frequency of cancellation, is given by $$\delta=\frac{v}{8f_c} \tag{11}$$

and the frequency of the modulating wave by $4f_c$.

Figure 6:
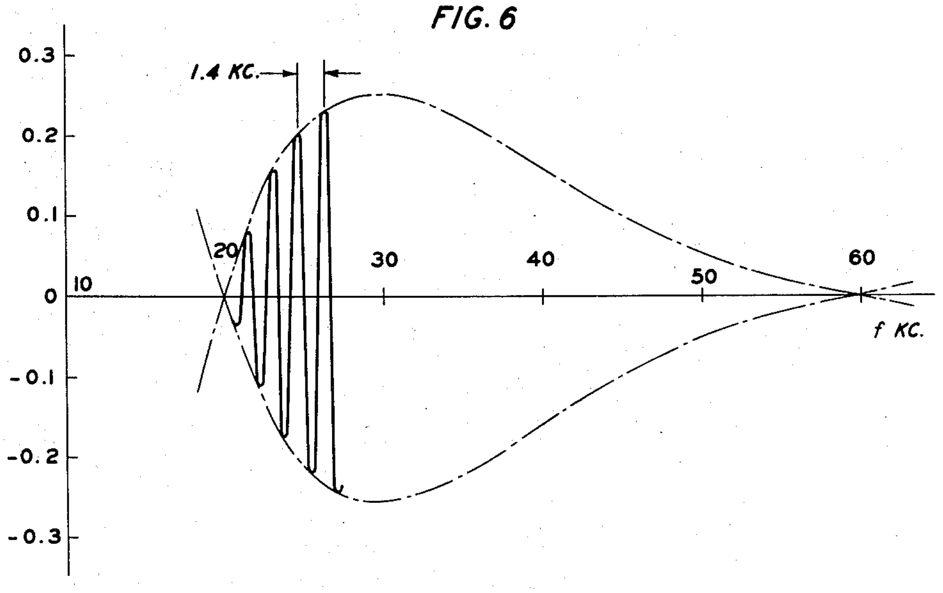
Fig. 6 illustrates the interaction ripples occurring in a long signal transmission system embodying the present invention.

Fig. 6 is obtained from this simple analysis by multiplying Equation 14 by 26 (the number of pairs of line-sections in one direction of transmission used both in the prior art example of Fig. 2 and, by way of example, in the embodiment of the invention shown in Fig. 5), thereby yielding the interaction factor for fifty-two line-sections, half of length $(l_4-\delta)$ and half of length $(l_0+\delta)$. In each section, $l_0$ is equal to 36.9 nautical miles and $\delta$ is equal to 0.625 nautical miles. In accordance with an important feature of the invention, this value of $\delta$ is provided to give cancellation of the interaction ripples at the bottom edge of the operating frequency band of the system, 20 kilocycles. In the embodiment of the invention shown in Fig. 5, the W–E line 12 and the E–W line 14 may each have operating frequency bands from 20 to 164 kilocycles. The staggered repeater spacing shown results in substantial cancellation of interaction ripples at 20 kilocycles in both lines and in major reduction of ripple amplitude throughout most of the operating frequency bands of both.

The plot in Fig. 6 has been normalized for comparison with Fig. 4 and all ordinates should be multipled by 0.8 to obtain ripple magnitudes in db. It should be noted, however, that the vertical scale in Fig. 6 is greatly expanded from the one used in Fig. 4 and that the maximum ripple amplitude shown in Fig. 6 is actually only about a quarter of the maximum ripple amplitude shown in Fig. 4. The improvement made possible in the present invention extends throughout the operating frequency band. As a result, employment of the present invention in a transoceanic submarine cable system like that shown in Fig. 1 substantially overcomes many of the problems associated with interaction ripples without requiring close matches between repeater and line impedances. The maximum available gain from the repeaters is retained and, as previously indicated, may be put to advantage either by decreasing the number of repeaters used in the system as a whole or by increasing the amount of stabilizing in-band negative feed-back used in each repeater.

Figure 7:
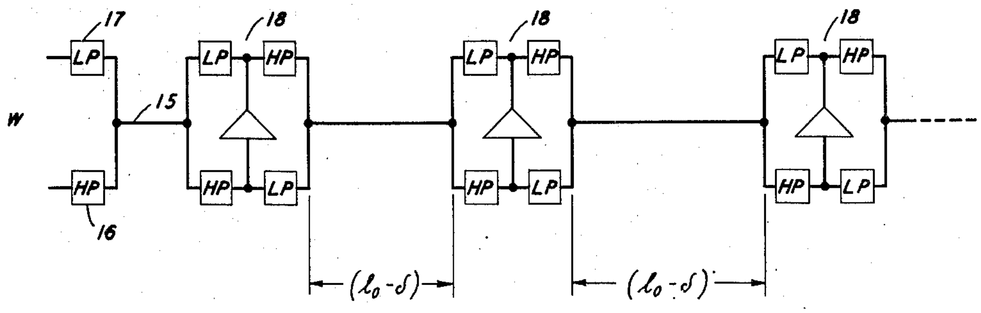
Fig. 7 shows one end of a repeatered two-wire signal transmission line arrangement suitable for use in Fig. 1 in which the repeater spacing is also staggered in accordance with the teachings of the invention.

The present invention is, of course, not restricted to application to "four-wire" transmission systems. Another arrangement which, in accordance with the present invention, may be used to advantage in a transoceanic submarine cable system like that shown in Fig. 1 is illustrated in Fig. 7. Fig. 7 shows one end of a repeatered "two-wire" transmission line, in which different carrier-frequency bands are used to provide the two opposite directions of transmission over a single line 15. By way of example, a band from 20 to 92 kilocycles may be used for transmission from west to east and the band from 92 to 164 kilocycles may be used for transmission from east to west. High and low pass filters 16 and 17 are used at the end of the system to separate the two directions of transmission and bilateral repeaters 18 are spaced at intervals along the line 15 fixed in accordance with the principles of the invention.

In accordance with the invention, the repeater spacing in the "two-wire" system shown in Fig. 1 is the same as that in the "four-wire" system illustrated in Fig. 5. The mean length throughout the system of the line-sections between successive repeaters is $l_0$ and the actual repeater spacing is staggered to make the actual lengths between repeaters of successive line-sections $(l_0-\delta)$ and $(l_0+\delta)$, respectively. As explained above, $\delta$ is a quarter of a wavelength along the line at a frequency at or near the bottom of the operating signal band of the system. In the arrangement shown in Fig. 5, the ripple cancellation frequency is at the bottom of the lower of the two carrier-frequency bands since it is at the lower frequencies that line attenuation is least and ripple magnitude is greatest.

While the invention has been described with particular reference to repeatered transoceanic carrier-frequency submarine telephone cables of the two and four-wire types, it is to be understood that the disclosed arrangements are illustrative of the applications of the principles of the invention. For example, other active or passive impedance networks such as equalizers can be located to advantage with the aid of the same principles. Numerous other arrangements may also be devised by those skilled in the art without departing from the spirit and scope of the invention.

What is claimed is:

1. A carrier signal transmission system which comprises a line adapted to transmit a wide band of frequencies and a plurality of separate wave translating networks connected in tandem in said line and spaced at substantially regular intervals therealong to divide said line into a succession of pairs of adjacent consecutive line-sections between networks, the length of one line-section in each pair being substantially $(l_0-\delta)$ and the length of the other line-section therein being substantially $(l_0+\delta)$, where $l_0$ is the mean length between the said networks of all of said line-sections and $\delta$ for each of said pairs is substantially a quarter of a wavelength along said line at one frequency in said band, whereby interaction ripples in the transmission characteristic of said line-sections add out-of-phase in each of said pairs and substantially cancel at the said frequency.

2. A carrier signal transmission system in accordance with claim 1 in which $\delta$ is the same for all of said pairs of line-sections.

3. A carrier signal transmission system in accordance with claim 1 in which for each of said pairs the frequency at which $\delta$ is substantially a quarter of a wavelength is in a portion of said frequency band substantially nearer the lower edge thereof than the upper edge thereof.

4. A carrier signal transmission system in accordance with claim 1 in which $\delta$ is the same for all of said pairs of line-sections and the frequency at which $\delta$ is substantially a quarter of a wavelength is in a portion of said frequency band substantially nearer the lower edge thereof than the upper edge thereof.

5. A carrier signal transmission system in accordance with claim 1 in which $\delta$ is the same for all of said pairs of line-sections and the frequency at which $\delta$ is substantially a quarter of a wavelength is at the lower edge of said frequency band.

6. A carrier signal transmission system which comprises a line adapted to transmit a wide band of frequencies and a plurality of repeaters having input and output impedances not necessarily matching the impedance of said line connected in tandem in said line and spaced at substantially regular intervals therealong to divide said line into a succession of pairs of adjacent consecutive line-sections between repeaters, the length of one line-section in each pair being substantially $(l_0-\delta)$ and the length of the other line-section therein being substantially $(l_0+\delta)$, where $l_0$ is the mean length between repeaters of all of said line-sections, $\delta$ for each of said pairs is substantially equal to $$\frac{v}{8f_c}$$

$v$ is the velocity of propagation over said line, and $f_c$ for each of said pairs is a frequency in said band, whereby interaction ripples in the transmission characteristic of said line-sections caused by reflections at the repeater-line impedance mismatches add out-of-phase in each of said pairs and substantially cancel at the frequency $f_c$.

7. A carrier signal transmission system in accordance with claim 6 in which $f_c$ is the same for all of said pairs of line-sections.

8. A carrier signal transmission system in accordance with claim 6 in which for each of said pairs the frequency $f_c$ is in a portion of said frequency band substantially nearer the lower edge thereof than the upper edge thereof.

9. A carrier signal transmission system in accordance with claim 6 in which $f_c$ is the same for all of said pairs of line-sections and is in a portion of said frequency band substantially nearer the lower edge thereof than the upper edge thereof.

10. A carrier signal transmission system in accordance with claim 6 in which $f_c$ is the same for all of said pairs of line-sections and is at the lower edge of said frequency band.

No references cited.